(12) United States Patent
Li et al.

(10) Patent No.: US 8,520,297 B2
(45) Date of Patent: Aug. 27, 2013

(54) SPECTRA SHAPING SCHEME FOR CHIRPED PULSE AMPLIFICATION

(76) Inventors: Ming Li, Shanghai (CN); Bin Zhang, Chengdu (CN); Yaping Dai, Shanghai (CN); Tao Wang, Shanghai (CN)

( * ) Notice: Subject to any disclaimer, the term of this patent is extended or adjusted under 35 U.S.C. 154(b) by 198 days.

(21) Appl. No.: 12/735,945

(22) PCT Filed: Mar. 5, 2009

(86) PCT No.: PCT/IB2009/050914
§ 371 (c)(1),
(2), (4) Date: Mar. 21, 2011

(87) PCT Pub. No.: WO2009/133477
PCT Pub. Date: Nov. 5, 2009

(65) Prior Publication Data
US 2011/0279889 A1   Nov. 17, 2011

(30) Foreign Application Priority Data
Feb. 26, 2008   (CN) .......................... 2008 1 0044818

(51) Int. Cl.
*H01S 3/00* (2006.01)
(52) U.S. Cl.
USPC .......................................... 359/333; 359/337

(58) Field of Classification Search
USPC .................................................. 359/333, 337
See application file for complete search history.

(56) References Cited

U.S. PATENT DOCUMENTS

| | | | |
|---|---|---|---|
| 6,507,398 B1* | 1/2003 | Arai et al. ..................... 356/328 |
| 2010/0053733 A1* | 3/2010 | Falcoz et al. ................ 359/337.5 |
| 2011/0211600 A1* | 9/2011 | Dantus et al. .................. 372/25 |
| 2012/0050843 A1* | 3/2012 | Limpert et al. ............ 359/337.5 |

* cited by examiner

*Primary Examiner* — Mark Hellner

(57) ABSTRACT

A spectrum shaping scheme for chirped pulse amplification (CPA): uses a spectrum decomposing system with CTSI construction, a spectrum synthesizing system with CTSI structure that is symmetrical to the decomposing structure, and a spectrum shaping system including an aperture and a planar reflector for spectrum shaping function design. The scheme includes the following steps: firstly decomposing the spectrum of a chirped temporal pulse laser to a spectral domain; then shaping the spectrum in the spectral domain; finally synthesizing un-shiftily this shaped spectrum in the spectral domain into a temporal chirped pulse with a designed shape. The scheme has the benefit that it can be not only utilized in a general laser spectrum shaping and spectrum modulation, but also can be utilized for a high energy and ultra-high peak-power laser system in chirped pulse amplification with a large caliber and with a chirped pulse bandwidth of a few nanometers.

10 Claims, 4 Drawing Sheets

SPECTRA SHAPING SCHEME FOR CHIRPED PULSE AMPLIFICATION

PRIORITY CLAIM

The application titled as a spectra shaping scheme for chirped pulse amplification is the international application, PCT/IB2009/050914, filed on 3 May 2009, for entry into the national stage in the United States, where it claims the benefit of the international filing date of the international application designating the United States of America.

TECHNICAL FIELD OF THE INVENTION

The present invention relates generally to a pulse shaping method for laser amplification in the power. The invention relates in particular to manipulating the spectral and temporal characteristics of laser pulses, which the spectra shaping scheme for chirped pulse amplification is for a large caliber and high power chirped pulse amplification (CPA) in huge energy, which belongs to the field of application technology of engineering optics.

DISCUSSION OF BACKGROUND ART

In the field of the high-power ultra-short laser pulse amplification, the enhancement of the output of a laser system is hampered by a series of factors such as the gain narrowing effect and the gain saturation effect in the solid-state laser amplification medium. The gain narrowing effect is caused by the limited bandwidth of the atomic emission in the laser medium and the frequency pulling effect, which makes the spectrum of the output pulse narrowing that not only leads to the deformity of the pulse waveform but also conducts the chirped pulse hard to be compressed into the original width. The gain saturation effect is another main factor leading to the distortion of CPA. It is caused by the pulse head depletion more the population inversion in the amplification medium than the pulse tail, which leads to the intensity of the pulse head getting more amplification than the intensity of the pulse tail. Hence the output of amplified pulse becomes asymmetric in the pulse waveform, which leads to the lose of amplification efficiency of chirped pulse, which leads to the red shift effect in the spectrum of the laser pulse, and which leads to the distortion of CPA. In order to compensate the gain narrowing and gain saturation effects of CPA, and also to improve the signal to noise ratio (SNR) of the output high-power laser pulse, people needs a kind of spectrum modulation method to shape the spectrum distribution of pre-amplification pulse, making it depression in the vicinity of center wavelength in some shapes and in some depths practically. In the inertial confinement fusion (ICF) field, the physics experiments have harsh requirements on the pulse parameter of the output laser. And lots of attention have been paid to the spatial distribution, the temporal profile, as well as the spectrum shaping in the design of kilojoules peta-watt-class laser system, in order to compensate the gain narrowing and gain saturation effects of CPA, and also to improve the SNR of the output high-power laser pulse, such as in the literatures: [X L Chu, B Zhang, B W Cai, et. al., "Study of the Multipass Amplification of the Chirped Pulse and Its Inverse Problem", Acta Phys. Sin., 2005, 54(10), 4696-1701], [B Zhang, B D Lü, "An Inverse Problem of Multistage and Multipass Pulsed Laser Amplifiers", Chin. J. Lasers, 1997, 24(6), 495-500], [T Wang, D Y Fan, "Pulse Shaping Design of High Power Laser Amplifier", High Power Laser and Particle Beams, 1999, 11(2), 139-142], and [X J Huang, X F Wei, H S Peng et. al. "On Structure of a Hundred Terawatt Class Ultra-short Laser System", 2004, the conference on optoelectronics in Sichuan].

The above literatures also illustrate some defects in the traditional shaping methods, just as following: 1. Using the thin etalon in regenerative amplification to tune the spectrum of the laser pulse, but it is complexity of the device regulation. In addition, an optical parametric chirped pulse amplifier (OPCPA) has substituted the regenerative amplifier in the front-end of kilojoules peta-watt-class laser system. So this method does not apply. 2. Using the center wavelength blue shift injection, that is, making the centre of the pulse wavelength blue shift relative to the centre wavelength of the medium spontaneous emission, making the long wavelength parts of the pulse with a large duration, and making the spectrum modulation directly, but it is not practical to a over terawatt ($10^{12}$) system. 3. Using the long-wavelength injection method that utilizes narrowing effect to compensate saturation effect, but this will make the system unstable. 4. Using the acousto-optic programmable dispersive filter (AOPDF) to compensate the spectral gain narrowing, but it has lower sufferance of the high power laser damages. Although it is equipped with a strong capability of gain compensation and dispersion compensation, it gets success just on the structure of a hundred terawatt class ultra-short laser system but not for the Nd:glass system.

At the same time, all the transmitted elements such as the optical filter and the birefringent crystal, and all the organic selection elements such as the hinged organic polymer used for modulating the spectrum of the laser pulse, are unusable for the high-power and huge-energy laser, such as in the literatures [P F Zhu, J X Yang, S L Xue, M R Li, Z Q Lin, "Spectrum Shaping of the Ultrashort Pulse", CHINESE J. OF LASERS, 2003, 30(12), 1075-1078]; [Y X Leng, L H Lin, Z Z Xu, "Spectrum Shaping in a Ti:Sapphire Regenerative Amplifier", ACTA OPT. SINICA, 2002, 22(02), 170-174]; the CN patent Ser. No.ZL200410025678.1 and the CN patent Ser. No. ZL200410024684.5.

Furthermore, the above literatures also illustrate some defects in the traditional shaping methods at the present, just as following: 1. Using the interference filter for selective transmission, but it exists difficult both in the principle of design and in the fabrication techniques, such as the principle of design can not avoid the Fabry-Perot (FP) side effect. When the modulation bandwidth is less than tens nanometers, the fabrication techniques can not control the bandwidth and the depth in the centre wavelength of the transmittance curve according to the limit of the coating techniques. At the same time, the incident angle of laser is required at high precision and less flexibility. 2. Using the combination lens of birefringent crystal for the selective transmission, here the interference between the ordinary light and the extraordinary light conducts the selective transmission, but it exists difficulty both in the principle of design and in the fabrication techniques. For example, the transmitted element can not avoid the side effect such as FP effect and the distortion of phase etc.; furthermore, the thickness of the birefringent crystal is determined by the spectrum bandwidth of the original pulse, which the law is: the less the bandwidth is, the more the thickness of the birefringent crystal required is. For instance, if the spectrum bandwidth of the ultra-short pulse is 13 nm, the thickness of the birefringent crystal must be 25 mm; however, the size of birefringent crystal can not be produced that large easily. 3. Using the hinged organic polymer waveguide or using the hinged organic polymer waveguide after a corona poling process for obtaining the characteristics of photoelectric effect for the selective reflection, but it has lower sufferance of the high power laser damages.

SUMMARY OF THE INVENTION

The present invention seeks to provide an improved pulse shaping method to overcome the defects in the traditional shaping methods mentioned above. The new spectra shaping scheme for chirped pulse amplification is proposed based on an improved Czerny-Turner Spectrum Instrument (CTSI) system, which involves two symmetrical CTSI systems, called a spectrum decomposing system and a spectrum synthesizing system respectively, and involves a spectrum shaping system. The process is as following: firstly, the chirped pulse is spread totally the frequency components of chirped pulse into a spatial place by the spectrum decomposing system. Then, its spectrum is modulated and shaped by the modulation system in the focus plane. And then, the spatial light is integrated un-shiftily by the spectrum synthesizing system back to a designed shape chirped pulse, which accomplishes the spectrum modulating and shaping function. The present invention solves the problem that the traditional shaping method in the world is not practical for a over terawatt ($10^{12}$) system or is unusable for a Nd:glass system narrow bandwidth system. The present invention can be not only utilized for a general laser spectrum shaping and spectrum modulating, but also especially utilized for a high energy and ultra-high peak-power laser systems with a few nanometers bandwidth and a large caliber in the Nd:glass CPA system.

In order to realize this invention, we have utilized a series of technological schemes as following steps:

A spectrum shaping scheme for chirped pulse amplification (CPA): The features are the comprising: a spectrum decomposing system with Czerny-Turner Spectroscope Instrument (CTSI) construction, and a spectrum synthesizing system with the CTSI structure that is symmetrically to the decomposing structure, in addition, a spectrum shaping system including an aperture and a planar reflector for spectrum shaping function design. The features are the processing: firstly decomposing the spectrum of a chirped temporal pulse laser to a spectral domain plane that is in the focus plane; then shaping the spectrum in the spectral domain; finally synthesizing un-shiftily this shaped spectrum in the spectral domain into a temporal chirped pulse with a shaped design. And the features are that in the optical path order: a laser beam from the front-end system of a CPA system passes through the first concave reflector, then via the first aperture, and the second concave reflector, it is transformed into a parallel light, then it passes through the first grating, the third concave reflector and the second aperture, which constitute a spectrum decomposing system with the CTSI construction and accomplish the collimation, the dispersion, and the imaging function. Then it passes through the second aperture and the planar reflector for spectrum shaping function design that is at the same place with the second aperture, which accomplish the spectral shaping function in the spectral domain. After that, it passes through the fourth concave reflector, the second grating, the fifth concave reflector and the third aperture, which constitute a spectrum synthesizing system with the CTSI construction and accomplish the imaging, the dispersion cancelling, and the synthesizing function. Finally it passes through the third aperture ejecting out after the completion of the spectrum decomposing, the spectrum modulation, and the spectrum synthesizing processes; then via the sixth concave reflector, it is transformed into a parallel light again, and sent into the following stage such as the solid-state amplifier to amplification.

The technological schemes of spectrum shaping: The features are that the first grating, and the second grating are the reflective planar blazed gratings, and at the same time they are symmetrical to each other. And the features are that the dispersion cancelling is when tuning these two gratings, making the direction of tuning angle should be ensure that: from the inversion optical path, tracing the direction of spectral distribution of different wavelengths at the second aperture in a spectrum synthesizing system with the CTSI construction, it should be the same as the direction of the spectral distribution of the different wavelengths at the second aperture in a spectrum decomposing system with the CTSI construction in the normal optical path tracing.

The technological schemes of spectrum shaping: The features are that the first aperture, and the third aperture are the aperture diaphragms in the real confocal telescope, which is constructed as an illumination system and as an image transfer construction. The features are that the illumination system is composed of the first concave reflector, the first aperture and the second concave reflector, or is composed of the sixth concave reflector, the third aperture and the fifth concave reflector, which ensures that the normal width is suitable for the coherence and the phase consisted conditions as a incident light, and the laser distribution that the laser beam obtained from the front-end system of a CPA system is not changed in the spatial and temporal domains, moreover the relative aperture in the illumination system must match with the relative apertures in the dispersion system and in the imaging system, and the clear aperture can fill the caliber of the dispersion element. The features are that the second aperture is a slit diaphragm consisted of a light barrier and its image in the planar reflector for spectrum shaping function design, and all the apertures must satisfy the normal width $a_0$ condition for a diaphragm, or the diffraction half width $a_0$ condition for the spectrum decomposing system with the CTSI construction and the spectrum synthesizing system with the CTSI construction, at the same time the second aperture and the third aperture can pass through the light with all the frequency components within the chirped laser pulse bandwidth. The features are that the optics components are selected constructing as a symmetrical imaging system relative to the dispersion component, or are selected constructing as an asymmetrical imaging system relative to the dispersion component for compensating the aberration of the image. The features are that the spectrum decomposing system with the CTSI construction and the spectrum synthesizing system with the CTSI construction must ensure that, in which the focal length of the collimation system and the focal length of the imaging system are equal, and also the lateral magnification are equal; or in which the construction of the spectrum decomposing system and the spectrum synthesizing system are absolutely symmetrical, furthermore, tracing in the inversion optical path direction, the focal length of a collimation system and the focal length of a imaging system are equal, and also the lateral magnification are equal. And the features are that all the concave reflectors are made in strictly eliminated the chromatic aberration, the spherical aberration, the comatic aberration, the astigmatism and the field curvature in the whole working frequency bandwidth, to ensure the maximal deviation between the spectrum image plane and the planar reflector for spectrum shaping function design less than the tolerance of the half focal depth.

The technological schemes of spectrum shaping: The features are that the planar reflector for spectrum shaping function design could be a multilayer dielectric thin film as a reflector for spectrum shaping with micro-structures in it, or a reflector for spectrum shaping with micro-mirrors structures in it, or a liquid crystal light valve, or a reflector for spectrum shaping with a varied line space grating in front of it, or a reflector for spectrum shaping with a liquid crystal spatial light modulator in front of it, or a reflector for spectrum shaping with micro-electromechanical mirrors, or a continuous deformation reflector for spectrum shaping, or a bimorph deformation reflector for spectrum shaping, or a reflector for spectrum shaping with a prism/waveguide coupling, or a reflector for spectrum shaping with a varied line space grating.

A spectrum shaping scheme for chirped pulse amplification (CPA): The features are the comprising: a spectrum decomposing system and a spectrum synthesizing system, with a planar modulation structure, with a CTSI structure, and with an self-collimation optical path construction; in addition, a spectrum shaping system including an aperture and a planar reflector for spectrum shaping function design. The features are the processing: firstly decomposing the spectrum of a chirped temporal pulse laser to a spectral domain plane that is in the focus plan; then shaping the spectrum in the spectral domain; finally synthesizing un-shiftily this shaped spectrum in the spectral domain into a temporal chirped pulse with a shaped design. And the features are that in the optical path order: a laser beam from the front-end system of a CPA system passes through the first beam splitter prism for polarization producing, via the ¼ wave plate and the first concave reflector, then it passes through the first aperture, and the second concave reflector, the first grating, the third concave reflector and the second aperture, which constitute a spectrum decomposing system with the CTSI construction and accomplish the collimation, the dispersion, and the imaging function. Then it passes through the second aperture and the planar reflector for spectrum shaping function design that is at the same place as the second aperture, which accomplish the spectral shaping function in the spectral domain. After that, it is reflected by the centro-symmetric concave reflector, its backward wave passes through the second aperture and the planar reflector for spectrum shaping function design that is at the same place with the second aperture, which accomplish the spectral shaping again. Then its backward wave passes through the third concave reflector, where it is collimated to the first grating, which these constitute a dispersion cancelling construction. Then, the parallel light incident into the second concave reflector is focused onto the first aperture, which above constitute a spectrum synthesizing system with the CTSI construction and accomplish the imaging, the dispersion cancelling, and the synthesizing function. Finally it passes through the first aperture ejecting out after chirped pulse spectrum decomposing, modulation, and synthesizing; via the first concave reflector and the ¼ wave plate, its polarization rotates 90 degree. Then it is reflected fully at the first beam splitter prism into the second beam splitter prism that is perpendicular to the first one for a polarization producing of the modulated chirping pulse and for cancelling the stray light, and then it is sent into the following stage such as the solid-state amplifier to amplification.

The technological schemes of spectrum shaping: The features are that the first aperture is the aperture diaphragm in the real confocal telescope, which constructed as an illumination system and as an image transfer system. The features are that the illumination system consisted of the first concave reflector, the first aperture and the second concave reflector, which ensure that the normal width is suitable for the coherence and the phase consisted conditions for a incident light, and the laser distribution that obtained from the front-end system of a CPA system is not changed in the spatial and temporal domains, moreover the relative aperture in the illumination system must match with the relative apertures in the dispersion system and in the imaging system, and the clear aperture can fill the caliber of the dispersion element. The features are that the second aperture is a slit diaphragm that is composed of a light barrier and its image in the planar reflector for spectrum shaping function design, and all the apertures must satisfy the normal width $a_0$ condition for a diaphragm, or the diffraction half width $a_0$ condition for the spectrum decomposing system with the CTSI construction and the spectrum synthesizing system with the CTSI construction, at the same time all the apertures can pass through the light with all the frequency components within the chirped laser pulse bandwidth. The features are that the first grating is the reflective planar blazed grating. The features are that all the concave reflectors are made in strictly eliminated the chromatic aberration, the spherical aberration, the comatic aberration, the astigmatism and the field curvature in the whole working frequency bandwidth, to ensure the maximal deviation between the spectrum image plane and the planar reflector for spectrum shaping function design less than the tolerance of the half focal depth. And the features are that the optics components are constructed as a symmetrical imaging system relative to the dispersion component, or are constructed as an asymmetrical imaging system relative to the dispersion component for compensating the aberration of the image.

The technological schemes of spectrum shaping: The features are that the planar reflector for spectrum shaping function design could be a multilayer dielectric thin film as a reflector for spectrum shaping with micro-structures in it, or a reflector for spectrum shaping with micro-mirrors structures in it, or a liquid crystal light valve, or a reflector for spectrum shaping with a varied line space grating in front of it, or a reflector for spectrum shaping with a liquid crystal spatial light modulator in front of it, or a reflector for spectrum shaping with micro-electromechanical mirrors, or a continuous deformation reflector for spectrum shaping, or a Bimorph deformation reflector for spectrum shaping, or a reflector for spectrum shaping with a prism/waveguide coupling, or a reflector for spectrum shaping with a varied line space grating.

A spectrum shaping scheme for chirped pulse amplification (CPA): The features are the comprising: a spectrum decomposing system and a spectrum synthesizing system, with a concave modulation structure, with a CTSI structure, and with an self-collimation optical path construction; in addition, a spectrum shaping system including an aperture and a concave reflector for spectrum shaping function design. The features are the processing: firstly decomposing the spectrum of a chirped temporal pulse laser to a spectral domain plane that is in the focus plan; then shaping the spectrum in the spectral domain; finally synthesizing un-shiftily this shaped spectrum in the spectral domain into a temporal chirped pulse with a shaped design. The features are that in the optical path order: a laser beam from the front-end system of a CPA system passes through the first beam splitter prism for polarization producing, via the ¼ wave plate and the first concave reflector, then it passes through the first aperture, and the second concave reflector, the first grating, the third concave reflector and the concave reflector for spectrum shaping function design, which constitute a spectrum decomposing system with the CTSI construction and accomplish the collimation, the dispersion, and the imaging functions. Then it is modulated by the concave reflector for spectrum shaping function design, which accomplish the spectral shaping function in the spectral domain. After that, it is reflected by the concave reflector for spectrum shaping function design, then its backward wave passes through the third concave reflector, where it is collimated to the first grating, which these constitute a dispersion cancelling construction. Then, the parallel light incident into the second concave reflector is focused onto the first aperture, which above constitute a spectrum synthesizing system with the CTSI construction and accomplish the imaging, the dispersion cancelling, and the synthesizing functions. Finally, it passes through the first aperture ejecting out after the spectrum decomposing, the spectrum modulation, and the spectrum synthesizing processes finished. Via the first concave reflector and the ¼ wave plate, its polarization rotates 90 degree. Then it is reflected fully at the first beam splitter prism to the second beam splitter prism that is perpendicular to the first one for a polarization producing of the modulated chirping pulse and for cancelling the stray light, and then it is sent into the following stage such as the solid-state amplifier to amplification.

The technological schemes of spectrum shaping: The features are that the first aperture is the aperture diaphragm in the real confocal telescope, which constructed as an illumination system and as an image transfer system. The features are that the illumination system consisted of the first concave reflector, the first aperture and the second concave reflector, which ensure that the normal width is suitable for the coherence and the phase consisted conditions for a incident light, and the laser distribution that obtained from the front-end system of a CPA system is not changed in the spatial and temporal domains, moreover the relative aperture in the illumination system must match with the relative apertures in the dispersion system and in the imaging system, and the clear aperture can fill the caliber of the dispersion element. The features are that all the apertures must satisfy the normal width $a_0$ condition for a diaphragm, or the diffraction half width $a_0$ condition for the spectrum decomposing system with the CTSI construction and the spectrum synthesizing system with the CTSI construction, at the same time all the apertures can pass through the light with all the frequency components within the chirped laser pulse bandwidth. The features are the first grating is the reflective planar blazed grating. The features are that all the concave reflectors are made in strictly eliminated the chromatic aberration, the spherical aberration, the comatic aberration, the astigmatism and the field curvature in the whole working frequency bandwidth, to ensure the maximal deviation between the spectrum image curved surface and the surface of the concaved reflector for spectrum shaping function design less than the tolerance of the half focal depth. And the features are that the optics components are constructed as a symmetrical imaging system relative to the dispersion component, or are constructed as an asymmetrical imaging system relative to the dispersion component for compensating the aberration of the image.

The technological schemes of spectrum shaping: The features are that the concave reflector for spectrum shaping function design is coated with high reflective and low reflective alternately multilayer dielectric thin films and with microstructures in it, or a concave reflector for spectrum shaping with micro-mirrors structures in it, or a concave liquid crystal light valve, or a concave reflector for spectrum shaping with a varied line space plane grating in front of it, or a concave reflector for spectrum shaping with a liquid crystal spatial light modulator in front of it, or a concave reflector for spectrum shaping with micro-electromechanical mirrors, or a concave continuous deformation reflector for spectrum shaping, or a concave bimorph deformation reflector for spectrum shaping, or a concave reflector for spectrum shaping with a prism/waveguide coupling, or a concave reflector for spectrum shaping with a varied line space plane grating.

The principle of the present invention of the spectra shaping scheme for chirped pulse amplification (CPA) is that: For a laser spectrum distribution, the method utilizes a symmetrical CTSI spectral decomposition system to decompose truthfully the chirped pulse spectrum to a spatial space, and utilizes a special modulation system to shape the space distribution on the focal plane, and then utilizes a symmetrical CTSI spectral synthesis system to compose un-shiftily this space distribution to a shaped frequency chirped pulse before incidence into the next amplifier stage, which accomplish the chirped pulse spectrum modulation and shaping functions. Adopting an improved CTSI spectral decomposing system and an improved CTSI spectral synthesizing system, the method has more tuning flexibility in spectrum shaping and modulation. Furthermore, selecting the reflective planar blazed grating can endure the high power laser damage and can be fabricated in a large caliber. Selecting the system structure is not worked exactly on the self-collimation structure for solving the Grating Wood Abnormality. Selecting the concave reflectors are suitable for this rational construction in the collimation system and the imaging system, and are made in strictly corrected the spherical aberration and the comatic aberration, to ensure the maximal deviation between the spectrum image curve and the surface of reflector for spectrum shaping function design less than the tolerance of the half focal depth according to the Rayleigh's Criterion. In addition, selecting the rational construction can adjust the position of the dispersion component relative to the two concave reflectors as objective reflectors, in order to minimize the astigmatism and the comatic aberration.

In CPA practice, to compensate the gain narrowing and the gain saturation, to obtain the shortest compressed pulse, and to improve the SNR of output, people need a kind of spectrum modulation method to shape the spectrum distribution of pre-amplification pulse making it depression in the vicinity of center wavelength in shapes and depths. In the detailed description of the embodiment, the scheme utilizes a multilayer dielectric thin film reflector with specific construction to realize the spectrum reshaping of the chirped pulse laser in large energy and high power Nd:glass CPA System. If the parameters of the thin film reflector are chosen differently, the results show that the reflectivity distribution of the multilayer dielectric film reflector can be controlled effectively different on the reflectivity curve and on the relative phase, so as to compensate the gain narrowing and the gain saturation effects. This method is based on a dispersion system to decompose the chirped pulse spectrum to a spatial space, and a microstructure on a multilayer dielectric thin film as a functional reflector to shape the space distribution, which can shape the spectrum distribution of pre-amplification pulse making it depression in the vicinity of center wavelength in shapes and depths. The details are illustrated in the literatures as the CN patent Ser. No. ZL200710049516.5 and the CN patent Ser. No. ZL200720080292.X The beneficial effects of the present invention compared with the traditional technological schemes of spectrum shaping are:

1. The present spectrum shaping method utilizes the improved CTSI system and the functional reflector for spectrum shaping design, which decomposes the chirped pulse spectrum, modulates it in the focus plane, then synthesizes the shaped pulse, which has solved the problems that the traditional shaping methods in the world are not applicable to a over terawatt ($10^{12}$) system, or are unusable for a Nd:glass system narrow bandwidth system.

2. The present spectrum shaping method adopts the reflective planar blazed grating, which can endure the high power laser damage and can be fabricated in a large caliber, which has solved the problem that the AOPDF to compensate the spectral gain narrowing gets success just on the structure of a hundred terawatt-class ultra-short laser system such as Ti:sapphire system but not on the Nd:glass system.

3. The present spectrum shaping method has the benefit that it is not only suitable for Ti:sapphire system but also suitable for the Nd:glass system; and has the benefit that the spectrum modulation range can be changed through rotating the reflective planar blazed grating by the axial direction paralleling to the grating groove axis.

4. The present spectrum shaping method adopts the multilayer dielectric thin film as a functional reflector for spectrum shaping design with micro-structures in it, at same time adopts the reflective planar blazed grating, which can endure the high power laser damage and can be fabricated in a large caliber. These measures have solved the problem of the intensity modulation in the reflective large caliber of beam, and have solved the problem of working under the high pick power condition.

5. The present spectrum shaping method adopts the multilayer dielectric thin film as a functional reflector for spectrum shaping design with micro-structures in it, which has solved the problem that the reflective phase must meet the coherence and the phase consisted condition in the CAP, and which has the benefit that the spectrum modulation ratio can be varied over 60% under the condition that the phase of the reflecting light remains nearly constant.

6. The present spectrum shaping method has the benefit that it can be not only utilized in the ICF spectrum shaping that make the solid-state laser driver ejecting a high-energy in addition to a high peak irradiance, but also can be utilized for a general laser spectrum shaping and spectrum modulation, and especially suitable for a high energy and ultra-high peak-power laser system in CPA with a large caliber and a chirped pulse bandwidth of a few nanometers.

7. The present spectrum shaping method adopts the real confocal telescope system, which constructed as an illumination system and as an image transfer construction, which has the benefit that the normal width is suitable for the coherence and the phase consisted conditions, which has solved the problem that the distribution of a laser do not changed in the spatial and temporal domain that the laser beam obtained from the front-end system of a CPA system, which has the benefit that it has a strong light gathering power, which has the benefit that the relative aperture in the illumination system matches with the relative apertures in the dispersion system and in the imaging system, and which has solved the problem that the clear aperture can fill the caliber of the dispersion element;

Figure 1:
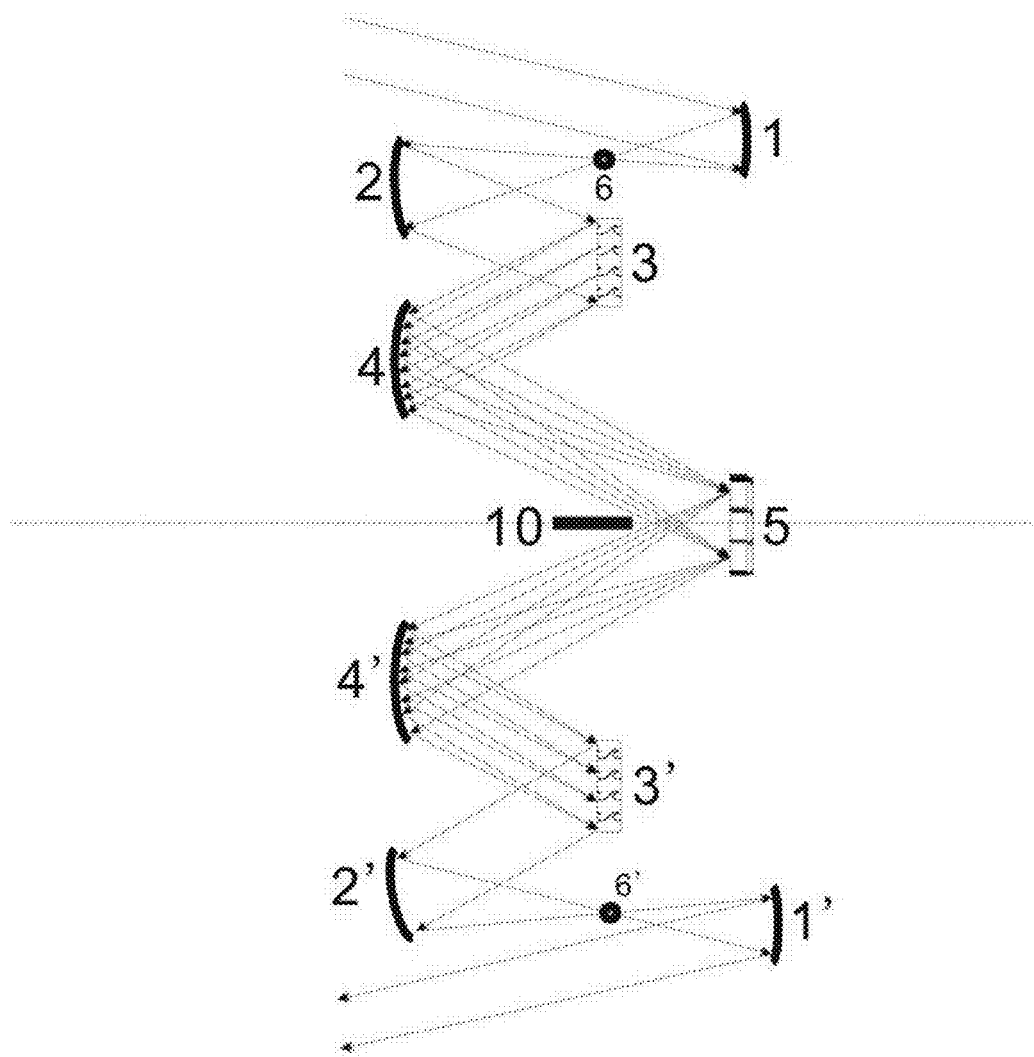
FIG. 1 schematically illustrates the structure of a symmetric CTSI spectrum shaping system embodying the present invention FIG. 2 schematically illustrates the structure of a self-collimation CTSI spectrum plane shaping system embodying the present invention FIG. 3 schematically illustrates the structure of a self-collimation CTSI spectrum concave shaping system embodying the present invention

In which, 1—the first concave reflector; 6—the first aperture; 2—the second concave reflector; 3—the first grating; 4—the third concave reflector; 5—the plane reflector for spectrum shaping design; 10—the second aperture; 4'—the fourth concave reflector; 3'—the second grating; 2'—the fifth concave reflector; 6'—the third aperture; 1'—the sixth concave reflector; 7-¼ wave plate; 8—the first beam splitter prism; 9—the second beam splitter prism; 4''—the centrosymmetric concave reflector; 5'—the concave reflector for spectrum shaping function design.

DETAILED DESCRIPTION OF THE INVENTION

The following will illustrate the present invention through discussing the working principle and the embodiment with the drawings; however, it should be interpreted as an example of the present invention but not as the definition of the scope of protection of the present invention.

The principle of spectrum shaping method of the present invention is:

1. The Spectrum Decomposing System 1.1. The Illumination System The illumination system is used for gathering the light as more energy as possible from the light source, and for transferring the light to the collimation system. In the present invention, the illumination system is composed of a real confocal telescope system, which ensures that the normal width is suitable for the coherence and the phase consisted conditions and making the laser distribution that the laser beam obtained from the front-end system of a CPA system do not change in the spatial and temporal domains. And the illumination system has a strong light gathering power, which the relative aperture in the illumination system must match with the relative apertures in the dispersion system and in the imaging system, and the clear aperture can fill the caliber of the dispersion element;

1.2. The Collimation System

Because the grating should working on the parallel light in the spectrum decomposing system and in the synthesizing system, the illumination light needs to be changed by a collimation system, which utilizes concave reflectors to fulfill this function. In the optical path order, a light from the incident aperture in the system construction is changed into a parallel light by the concave reflectors, and then it illuminates the grating, which called the illumination system. Usually the illumination system is composed of a slot and an objective lens, where the slot is posited in the front focus of the objective lens. However, the aperture in present invention is the aperture diaphragm in the real confocal telescope under the cause of a laser illumination, which replaces the slot in the illumination system, which is the real light source for the following system, and which is the boundary of the beam of an incident light.

1.3. The Dispersion System

The dispersion system is used for decomposing the spectrum of the compound light to a spatial space. However, the spectroscopic prism has a lower dispersive power, and the image of spectrum of the prism inherently has a tilt and distortion, so the spectrum prism is not applicable to the CPA spectrum shaping system. The multiple-beam interferometer such as Fabry-Perot(FP) and Lu Mu-mageik parallel plate has a high-resolution of dispersion, but it can not blaze and it can not endure the high laser energy, and its optical path can not be reversible, so the multiple-beam interferometer is not selected. The concave grating system is simple in construction, but its fabrication can not be easy, its effective area is small, its image can not be clear, its astigmatism is large, and its linear dispersion can not be uniform, so the concave grating is not selected. The spectrum filter is a transmission element, which it has lower sufferance of the high power laser damages, and the transmitted element can not avoid the side effect such as Fabry-Perot(FP) effect and the distortion of phrase etc., so the spectrum filter is not selected. The echelon grating has a high-resolution of dispersion, but it can not be fabricated easily, and its free spectral range is very small, so the echelon grating is not selected. Therefore, the reflective planar blazed grating is selected in the present invention, which can endure the high energy and high power laser damage, and which can be fabricated in a large caliber.

1.3.1 The Principle of Spectrum Grating Decomposing

As all the incidence and diffraction light in the principal section of grating, the maximum condition of interference of two adjacent rays defines the grating equation as $$d_1(\sin \alpha_1 + \sin \beta_1) = m_1 \lambda \tag{1}$$

where, $\alpha_1$ is the incident angle relative to the spectrum decomposing grating; $\beta_1$ is the diffraction angle relative to the spectrum decomposing grating; $d_1$ is the grating space relative to the spectrum decomposing grating, called the grating constant; $m_1$ is the order of spectrum relative to the spectrum decomposing grating that is an integer; $\lambda$ is the wavelength. Then Eq. (1) becomes $$\beta_1(\lambda) = \arcsin\left(\frac{m_1 \lambda}{d_1} - \sin\alpha_1\right) \tag{2}$$

Apparently, the Eq. (2) illustrates that when the grating space $d_1$ and the incident angle $\alpha_1$ are given, the diffraction angle $\beta_1$ is larger correspond to the wavelength $\lambda$ longer in the same order of spectrum of the grating $m_1$ level except the zero level. Therefore, the great light of different wavelengths at the same level of the main value appears in the same location of different spaces, which spreads the spectrum by the order from the short wavelength to the long wavelength, from zero level to the larger level of the main value, locating beside the zero level at right and left. Typically, the diffraction angle for a long wavelength is larger than that for a short one, and the distribution of diffractive light is strictly linear, coinciding with the order of wavelength. Because the number of grating grooves is huge, the angular breadth of the great light of diffraction light is mince, which its effect is alike that the fringe is sharper in the fringes pattern. So the pattern of the grating diffraction after the objective lens is a fine and bright line in the focus plane—the spectrum line in practice.

1.3.2 The Principle of Spectrum Grating Synthesizing

Described in the geometrical optics: the great light of different wavelengths at the same level of the main value appears in the same location of different spaces, which the distribution of diffractive light is strictly linear, coinciding with the order of wavelength. Inversely, when the monochromatic light incident in the diffraction angle $\beta(\lambda)$ coinciding with the order of wavelength is converged onto a grating, the grating can combine these monochromatic lights in the order of wavelength to a synthesizing light in the space, which is the result of the multiple-slit diffraction and interference in principle. The great light of the synthesizing light from the grating is determined by the primary maximum conditions for the grating diffraction pattern of all different monochromatic lights. Usually the reflective planar blazed grating is utilized as the spectrum synthesizing element, therefore, as light incident into a main surface, the maximum condition of interference of two adjacent rays defines the grating equation as $$d_2(\sin \alpha_2 + \sin \beta_2) = m_2 \lambda \tag{3}$$

which, $\alpha_2$ is the incident angle relative to the spectrum synthesizing grating; $\beta_2$ is the diffraction angle relative to the spectrum synthesizing grating; $d_2$ is the grating space relative to the spectrum synthesizing grating, called grating constant; $m_2$ is the order of spectrum relative to the spectrum synthesizing grating that is an integer. If the energy loss is neglected, and if all the diffraction lights are a convergent-type spherical wave synthesizing, substituting the Eq. (2) into Eq. (3), that is $\alpha_2(\lambda) = \beta_1(\lambda)$, the grating equation is $$d_2\left(\sin\left(\arcsin\left(\frac{m_1 \lambda}{d_1} - \sin\alpha_1\right)\right) + \sin\beta_2\right) = m_2 \lambda \tag{4}$$

When $d_2 = d_1$, and $m_2 = m_1$, the Eq. (4) changes to $$\sin \beta_2 = \sin \alpha_1 \tag{5}$$

If the principal range is $(0, \pi/2)$, from the Eq. (5), we have)

$$\beta_2 = \alpha_1 \tag{6}$$

The Eqs. (4), (5) and (6) illustrate that: the grating can combine these monochromatic lights in the order of wavelength to a synthesizing light in the space, which the output angle $\beta_2(\lambda)$ is equal to the incident angle $\alpha_1$ that is in the spectrum decomposing, when a monochromatic light as a convergent-type spherical wave incident in the diffraction angle $$\beta_1(\lambda) = \arcsin\left(\frac{m\lambda}{d} - \sin\alpha_1\right)$$

into the spectrum synthesizing grating, when the grating constants are the same in the spectrum decomposing grating and the spectrum synthesizing grating, which is $d_2 = d_1$; when the order of spectrum of grating are the same in the spectrum decomposing and synthesizing, which is $m_2 = m_1$; and when the grating blazed, which the principal range is $(0, \pi/2)$. Therefore, the output angle for all the monochromatic lights is equal to a constant, which is the result of the multiple-slit diffraction and interference in principle. In practical, selecting the monochromatic lights in the first level of the grating diffraction pattern that concentrates more than 90% energy for synthesizing, so the great light of the synthesizing light from the grating is bright, and its position is determined by the primary maximum condition for the grating diffraction pattern of all the different monochromatic lights, which is $\beta_2 = \alpha_1$. Usually the reflective planar blazed grating is utilized as the spectrum synthesizing element.

The following will discuss how to select the geometrical parameters of a synthesizing grating, taking the reflective planar blazed grating with slope surface of gold plating grooves as an example. The geometrical parameters of a reflective planar blazed grating defined as following: there is a slope surface A of the reflective planar blazed grating with slope surface of gold plating grooves, where b is the width of the grooved surface, t is the angle of the groove mode, and d is the grating constant. According to the requirement of concentrating all the light energy to a certain order of spectrum of grating, the primary maximum of the diffraction light must coincide with the reflective light from the slope surface that is the diffraction light in zero level, where the equation is $$2\sin t \cos(\alpha_2(\lambda) - t) = \frac{m\lambda}{d} \tag{7}$$

At the same time, the primary maximum of the diffraction light in zero level of the grating spectrum must coincide with the primary minimum of the diffraction light in first level when the slope surface A is a single slit for diffraction, where b is its width of the grooved surface; hence the equation becomes $$2\sin t \cos(\alpha_2(\lambda)) = \frac{\lambda}{b} \quad (8)$$

When the order of grating of spectrum, the wavelength and the incident angle are defined by the Eqs. (1)-(6), the fabrication section parameters (b, d, t) can be calculated from the Eqs. (7) and (8). So the general condition of a planar blazed grating, called the Vice Blazed Condition, should be $$t = \frac{\alpha_2 + \beta_2}{2} \quad (9)$$

which, t is the angle of the Groove Mode that is the angle between the grooved surface and the plane of grating or the angle between the normal line n of the grooved surface and the normal line n of the plane of grating, called the grating blazed angle; when the grating works under the Littrow mounting, which is $\alpha_2=\beta_2=t$, called the primary diffraction condition, we have:

$$\sin 2t = \frac{\lambda_B}{b}, \quad 2\sin t = \frac{\lambda_B}{d} \quad (10)$$

Usually the grating is working under the wavelength range $$\frac{\lambda}{d} < 0.8,$$

and using its first diffraction level in the self-collimation construction, in order to get the highest diffraction efficiency and the largest free spectral range. However, the practical grating experiments show that the Grating Wood Abnormality is something related to the polarization of the incident light, although the grating is designed coinciding with the principle of the grating geometric parameters design mentioned above. Therefore we choose the system structure, which is not worked exactly on the self-collimation to avoid the Grating Wood Abnormality. So the blazed direction under the non-Littrow mounting is $$\theta_b = \beta_2 = 2t - \alpha_2(\lambda) \quad (11)$$

and the blazed wavelength under the Vice Blazed Condition is $$\lambda_b = \lambda_B \cos\frac{\delta_b}{2} \quad (12)$$
$$= \lambda_B \cos\left(\frac{\beta_2 - \alpha_2}{2}\right)$$
$$= \lambda_B \cos\left(t - \arcsin\left(\frac{m_1\lambda}{d_1} - \sin\alpha_1\right)\right)$$

which, $\delta_b$ is the angle between the incident light and the diffraction light, $\lambda_B$, $\lambda_b$ are the blazing wavelengths under the blazed direction and the Vice Blazed Condition. The Eqs. (11) and (12) show that: if the centre-wavelength blazing, the peripheral wavelength blazes its output although the diffraction efficiency is a bit lower than that in centre wavelength. Hence, the reflective planar grating blazing for the centre-wavelength is selected for the spectrum synthesizing element, and for the decomposing grating element.

The rigorous wave theory has proved the mechanism of the spectrum grating synthesizing, that is: If the position of a spectrum distribution in the spectral plane is $(-f, y_m)$, where $-f$ is the front focus plane of the objective lens, where the spectrum distribution before synthesizing is in here; and $y_m$ is the position of the monochromatic light in the spectrum vertical distribution.; And, the position of the diffraction grating is (f, 0) that is in the back focus; In addition, let the centre wavelength locate in the optical axis, let the primary maximum of the grating grooves diffraction coincides with the primary maximum of interference of the minus first (−1) level, and let the primary maximum of interference of the zero (0) level coincides with the primary minimum of grating grooves diffraction of the first (+1) level; Furthermore, let the another wavelength locate in the up and down of the optical axis, let the primary maximum of interference of the minus first (−1) level of other wavelength coincide with the primary maximum of grating grooves diffraction of the centre-wavelength; And let the angle between the normal line n of the grating plane and the optical axis of the objective lens be a half of the angle of Groove Mode t, where d is about 1 μm; Therefore, the diffraction output of the compound light obtains the characteristics that the beams overlap each other in the near-field and the far-field well, the half-angular width of the output beam is mince, the intensity of the output is strong, the diffraction efficiency is large, and the energy utilization of the incident light is more effective. Further more, using this kind of spectrum grating synthesizing, the beam quality can reach the nearly diffraction limited quality, where the law is that the smaller the angle of groove mode t is, the smaller the half-angular width of the output beam is.

1.4 The Image System

The image system is used for converging the spread diffraction lights in the order of wavelength onto the focus plane of the objective lens, forming an array of monochromatic image in the order of wavelength spectrum. There are three kinds of spectrum patterns for different research objects: the line spectrum, the band spectrum, and the continuous spectrum. As for chirped pulse decomposing, shaping, and synthesizing, the spectrum pattern in the chirped pulse bandwidth is a continuous spectrum or the first level band spectrum.

In addition, the image system is used for compensating the comatic aberration and the astigmatism correction. The spherical aberration in the image system can not be cancelled by adjusting the element position, but it must be corrected to less than the tolerance of the image system aberration and the collimation system aberrations in the fabrication and design stages. When the concave reflector is used just as a collimation lens and an objective lens, selecting the paraboloid reflector can cancel the spherical aberration. However, the comatic aberration can be cancelled by adjusting the collimation lens' and the objective lens' position, and designing a special construction to correct. In the present invention, adjusting the relative position between the dispersion element and two concave reflectors as the objective lens eliminates the comatic aberration. In addition, the astigmatism in the image system can not be cancelled by selecting an appropriate geometrical parameter of the concave reflector in the fabrication when the concave reflector is used as a collimation lens and an objective lens. However, the astigmatism can be cancelled by adjusting the relative position of the dispersion element and the two objective reflectors, and designing a special construction to correct.

2. The Spectrum Shaping System

Figure 4:
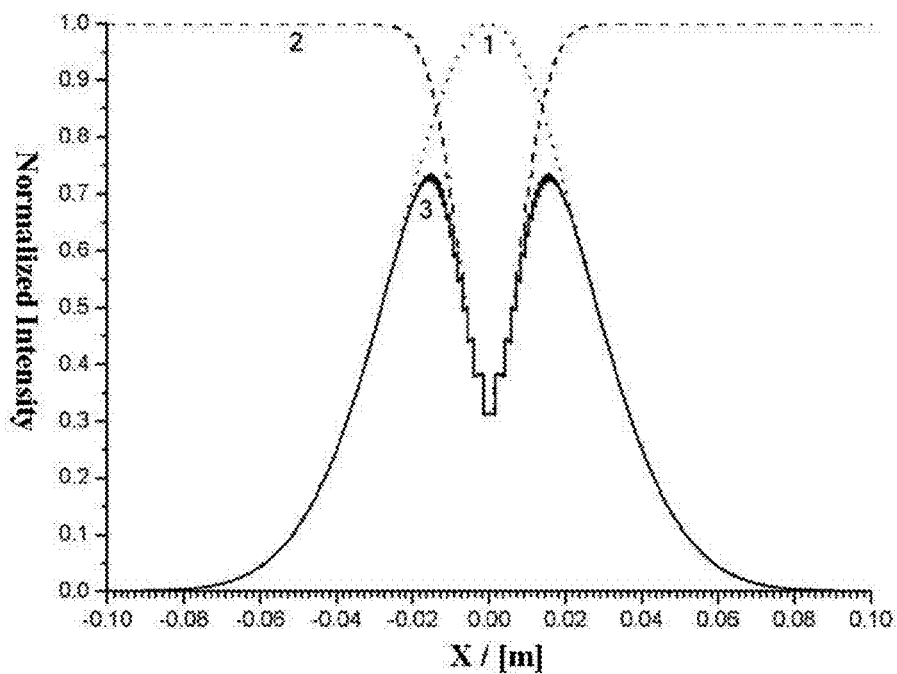
FIG. 4 is a graph schematically illustrating the distribution of spectrum after modulation by the functional reflector for spectrum shaping design

The spectrum shaping system is composed of an aperture and a planar reflector for spectrum shaping function design, where the chirped pulse passes through the image system, and projects onto this functional reflector. The planar reflector for spectrum shaping function design is a microstructure on a multilayer dielectric thin film as a functional reflector to shape the space distribution, where the outer part of the pagoda-step microstructure is the high reflective thin film system and the pagoda-step microstructure is the antireflective thin film system. The high reflective thin film system accomplishes the diffraction intensity modulation as chirped pulse passing grating system, while the antireflective coating microstructure increases the flexibility of the spectrum modulation. With the pagoda-step of the microstructure, a different step level of the mirror corresponds to the horizontal location of the spectra modulating, where all reflected light has a same phase. Therefore, the intensity on the surface of the functional reflector is the shaped spectra. The FIG. 4 illustrates that: this planar reflector for spectrum shaping function design can make a depression in the vicinity of the center wavelength to shape the reflective intensity into a designed spectrum distribution, where curve 1 is the incident chirped pulse spectrum, curve 2 is the modulation curve of a multilayer dielectric reflector determined by the microstructure, and curve 3 is the distribution of chirped pulse spectrum after modulation. Therefore, a suitable pre-amplification pulse, which meets the requirement of the spectrum shaping of a high energy and high power CPA system, can be accomplished by designing the microstructure and controlling the processing accuracy rationally.

3. The Spectrum Synthesizing System

According the principle of spectrum grating synthesizing: the great light of different wavelengths at the same level of the main value appears in a monochromatic distribution of diffractive light linearly, when the monochromatic lights incident in the diffraction angle $\beta(\lambda)$ converging onto a grating, the grating can combine these monochromatic lights in the order of wavelength to a synthesized light in the space. The spectrum synthesizing process in the optical path order is that: a light from the spectrum shaping function reflector as a incident light of the spectrum synthesizing system after paralleled by a collimation reflector is projected onto a grating, where the imaging, the dispersion cancelling, and the synthesizing are accomplished; finally it images onto a output aperture ejecting out by a concave image reflector; at this point, this is the whole spectrum synthesizing unit, called the spectrum synthesizing system with CTSI construction.

The spectrum synthesizing system is composed of a symmetrical dispersion system and a symmetrical image system after the spectrum shaping function reflector, in which the features are that: the spectrum synthesizing system images symmetrically to the spectrum decomposing system, cancels dispersion unanimously to the spectrum decomposing system, and subtracts the optical path difference of the different monochromatic lights to zero, making the extra residual dispersion be zero practically. Therefore, we must design the spectrum decomposing system with the CTSI construction and the spectrum synthesizing system with the CTSI construction exactly the same and symmetrical, in which the focal length of the collimation system and the focal length of the imaging system are equal, and also the lateral magnification are equal; or in which the construction of the spectrum decomposing system and the spectrum synthesizing system are absolutely symmetrical; furthermore, in which tracing in the inversion optical path direction, the focal length of a collimation system and the focal length of a imaging system are equal, and also the lateral magnification are equal. Hence, the extra residual dispersion can be made to zero practically under the condition that the widths of all apertures and their images are equal.

4. The Principle of the Aperture Design

According the criterion that the diameter of the disc of confusion in the focus plane is defined as 2 dr' that is caused by the spherical aberration and the comatic aberration, and the width of the disc of confusion in the dispersion direction is defined as a'. The diameter 2 dr' or the width a' must be less than a certain value $a_0$, which called the criteria value of aperture. So the size of the incident aperture is defined by the normal width or the half-width of dispersion as following:

$$a_0 = \lambda \frac{f'}{D} = a_1 \tag{13}$$

$$2dr' \text{ or } a' \leq a_0 \tag{14}$$

In order to let all the output light of the spectrum decomposing system with CTSI construction passes through the spectrum synthesizing system with CTSI construction, the exit pupil of the spectrum decomposing system must coincide with the entrance pupil of the spectrum synthesizing system; or the beam-out from the centre of the first dispersion element or the first dispersion component must pass through the centre of the second dispersion component.

In addition, the apertures at the middle position and at the output position should not limit the laser beam, that is to say, all the frequency components within the chirped pulse bandwidth should pass though the system; at the same time, the spectrum decomposing system with CTSI construction and the spectrum synthesizing system with CTSI construction must be constructed as dispersion cancelling mode, making the spectrum shaping system cancel all the residual dispersion. And the width of the spectrum line is determined by the widths of the apertures at the incident position and at the middle position. So the widths of the apertures at the middle position and at the output position should satisfy that $$a_2 \geq \gamma a_1 + b_1 \tag{15}$$

$$a_3 \geq \gamma^2 a_1 + b_2 \tag{16}$$

where $a_1$, $a_2$ and $a_3$ are the widths of the apertures at the incident, middle, and output positions, respectively; $b_1$, $b_2$ are the widths of the image aberrations at the middle and the output apertures, which the images are those the incident aperture $a_1$ imaged onto the middle and the output apertures $a_2$, $a_3$ respectively.

5. The Tolerance of the Imaging and Collimation System Aberrations

Before assembling the spectrum shaping system, the spectrum decomposing system with CTSI construction and the spectrum synthesizing system with CTSI construction must first correct the aberration respectively, which ensures that the total aberration must be within the tolerance of engineering aberration design. The requirement of the aberration correction can be summarized by: 1. making the spectrum image plane straight in the whole visual field; 2. making the spectrum clear and symmetrical in the whole spectrum plane; 3. making the intensity distribution of the spectrum uniform along the vertical direction. Furthermore, because the collimation system of the spectrum decomposing system with CTSI construction and the spectrum synthesizing system with CTSI construction is featured as a small relative aperture and a small visual field, the imaging system of this system is also a small relative aperture and a middle visual field system.

In addition, the requirement for the parameter of aberration correction can be summarized as that: all the objective reflectors of the collimation system and the imaging system are made with strictly corrected the spherical aberration and the comatic aberration. Empirically, we select the Rayleigh's Criterion as the tolerance of the imaging and collimation system's aberrations, where the Rayleigh's Criterion is that the maximum wave aberration of the residual spherical aberration and the residual comatic aberration must be less than $\lambda/4$. According to the relation between the wave aberration and the axial aberration, the tolerances of the spherical aberration and the comatic aberration of the concave reflectors are the axial spherical aberration:

$$LA' \leq \frac{8}{3}\lambda\left(\frac{f'}{D}\right) \quad (17)$$

the deflection sine condition $$OSC' \leq \frac{\lambda}{nl}\left(\frac{f'}{D}\right) \quad (18)$$

where, D is the diameter of the effective aperture, which is the effective size of the dispersion element in the spectrum decomposing system with CTSI construction and the spectrum synthesizing system with CTSI construction; f' is the focal length of the objective lens; $\lambda$ is the wavelength of a certain light; l is the distance from the principal ray in the boundary or the spectrum line in the boundary to the optical axis.

At the present invention, selecting the concave reflector as the collimation objective lens and as the imaging objective lens in all structure, the spherical aberration can not be cancelled by adjusting the elements position. When the spherical aberration needs to be corrected especially, the concave reflector can be substituted by an aspherical reflector. However, because the primary comatic aberration of the parabolic reflector is larger than that of the spherical reflector, the spherical reflector is used universally. Therefore, if the system must adopt the spherical reflector, the size of the relative aperture must be controlled to make the diameter of the disc of confusion of the spherical aberration less than the tolerance of the normal width $a_0$. While the comatic aberration can be cancelled by adjusting the relative positions of the two objective reflector. The present invention corrects the comatic aberration to near zero by designing an improved CTSI special construction and controlling the size of the relative aperture.

Straightening the spectrum plane: the maximal deviation between the spectrum image plane and the planar reflector for spectrum shaping function design must be less than the tolerance of the half-focal depth, which is $$\frac{1}{2}\Delta F \leq 2\lambda\left(\frac{f'}{D}\right)^2 \quad (19)$$

where, $\Delta F$ is the focal depth. Usually the bending of the spectrum plane is dominated by the chromatic aberration of the collimation system and the imaging system, and straightening the spectrum plane is resulted from the compensation between the chromatic aberration and the field curvature in the meridian plane of the collimation and the imaging objective reflectors. However, in present invention, because the lateral magnification of the grating changes slightly with the wavelength difference, so the method mention above can not be adopted. Therefore, all the objective lenses should be made with strictly eliminating the chromatic aberration, hence selecting the concave reflector as the collimation and imaging objective lens in the present invention.

Astigmatism cancelling: because all the collimation objective lenses and the imaging lenses are concave reflectors, we can not cancel the astigmatism by selecting a rational geometrical parameter of the objective reflector. In present invention, controlling the size of the relative aperture and improving the CTSI system construction are adopted to cancel the astigmatism.

DETAILED DESCRIPTION OF THE EMBODIMENT

Example 1 of the Method

In this example 1, there are those: both the first grating 3 and the second grating 3' are the reflective planar blazed gratings, which can endure high power laser damage and can be fabricated in a large caliber. The planar reflector for spectrum shaping is a multilayer dielectric thin film with microstructures in it. The concave reflectors are made with strictly eliminating the chromatic aberration, the spherical aberration, and the comatic aberration, to ensure the maximal deviation between the spectrum image plane and the planar reflector for spectrum shaping function design less than the tolerance of the half focal depth deduced from the Rayleigh's Criterion. The first aperture 6, and the third aperture 6' are aperture diaphragms, and the second aperture 10 is a slit diaphragm that is composed of a light barrier and its image in the planar reflector for spectrum shaping function design 5. The first aperture 6 is the incident aperture, the second aperture 10 is the middle aperture, and the third aperture 6' is the output aperture.

FIG. 1 schematically illustrates the structure of a symmetric CTSI spectrum shaping system, which the above elements are settled in this optical path construction.

In this example 1, the symmetric spectrum shaping synthesizing system with the CTSI structure is symmetrical to the symmetric spectrum shaping decomposing system with CTSI construction. And selecting the second aperture 10 and the functional reflector for spectrum shaping function design 5 constitutes the spectrum shaping system. The corresponding optical path order is: firstly decomposing the spectrum of a chirped temporal pulse laser to a spectral domain plane that is in the focus plane by the spectrum decomposing system with CTSI construction; then shaping the spectrum in the spectral domain by the spectrum shaping system; finally synthesizing un-shiftily this shaped spectrum in the spectral domain into a temporal chirped pulse with a designed shape by the spectrum synthesizing system with CTSI structure, in order to shape spectrum of the chirped pulse for amplification.

The symmetric CTSI spectrum shaping decomposing system: describing in the optical path order, a laser beam from the front-end system of a CPA system passes through the first concave reflector 1 and the second concave reflector 2, which constitute the image transfer construction. Then it focuses onto the first aperture 6. Hence the illumination system is composed of the first concave reflector 1, the first aperture 6, and the second concave reflector 2. Here the first aperture becomes the incident aperture of the spectrum shaping in example 1 structure. The laser beam passes through the second concave reflector 2, where it is transformed into a parallel light, then it is projected onto the first grating 3, which constitutes the collimation system. However, because of the laser illumination, the first aperture 6 substitutes the slit diaphragm in general CTSI system, and serves as the real light source for the following system, which limits the beam of an incident light entering into the structure of the symmetric CTSI spectrum shaping system. The laser beam from the first aperture 6 passes through the second concave reflector 2, where it is transformed into a parallel light, and then it is projected onto the first grating 3, which comprises the dispersion system. After that, the diffraction light passes through the third concave reflector 4 imaging onto the second aperture 10. At this point, all these above constitute the whole spectrum decomposing system, which is denoted by the optical path order 6-2-3-4-5.

The spectrum shaping system: the spectral shaping system is composed of the second aperture 10 and the planar reflector for spectrum shaping function design 5 that is at the same place with the second aperture. Here, the planar reflector for spectrum shaping function design 5 is featured by a multilayer dielectric thin film as a planar reflector for spectrum shaping with microstructures in it, which makes the spectrum of chirped pulse a depression in the vicinity of the center wavelength but remaining the phase of the reflecting light nearly constant. Furthermore, the spectrum shaping system requires that the maximal deviation between the spectrum image plane and the planar reflector for spectrum shaping function design is less than the tolerance of the half focal depth deduced from the Rayleigh's Criterion, and requires that the diameter 2 dr' of the disc of confusion in the focus plane, or the width a' of the disc of confusion in the direction of the dispersion are less than a certain value $a_0$. The FIG. 4 illustrates that: this planar reflector for spectrum shaping function design can make a depression in the vicinity of the center to shape the reflective intensity into a design spectrum distribution, where curve 1 is the incident chirped pulse spectrum, curve 2 is the modulation curve of a multilayer dielectric reflector determined by the microstructure, and curve 3 is the distribution of chirped pulse spectrum after modulation.

The symmetric CTSI spectrum shaping synthesizing system: that is the symmetrical imaging system and the dispersion system after the second aperture 10. The illumination system of this CTSI spectrum synthesizing system is composed of the sixth concave reflector 1', the third concave reflector 6' and the fifth concave reflector 2'. This symmetric CTSI spectrum shaping synthesizing system is composed of the planar reflector for spectrum shaping function design 5; and the fourth concave reflector 4', the second grating 3', the fifth concave reflector 2', and the third concave reflector 6'. All these above constitute the whole spectrum synthesizing system, which is denoted by the optical path order 5-4'-3'-2'-6'. The features are that: the spectrum synthesizing system 5-4'-3'-2'-6' cancels the dispersion of the spectrum decomposing system 6-2-3-4-5, wherein the dispersion cancelling is that: when tuning the first gratings 3 and the second grating 3', the direction of tuning angles should ensure that: from the inversion optical path, tracing the direction of spectral distribution of different wavelength at the second aperture 10 in a spectrum synthesizing system with the CTSI construction, the direction should be the same as that of the spectral distribution of the different wavelength at the second aperture 10 in a spectrum decomposing system with the CTSI construction in the normal optical path tracing, which makes the optical path difference of the different monochromatic light be zero, which makes the extra residual dispersion be zero practically.

Figure 5:
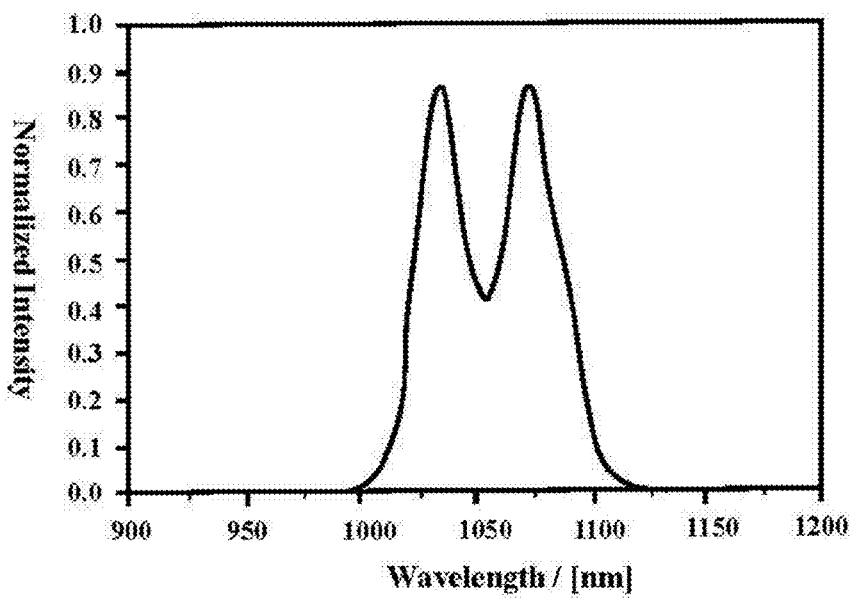
FIG. 5 is a graph schematically illustrating the shaped pulse waveform of spectrum after modulation by the construction in FIG. 1, or in FIG. 2, or in FIG. 3.

Finally the chirped pulse passes through the third aperture 6' ejecting out after the spectrum decomposing, the spectrum modulation, and the spectrum synthesizing processes; then via the sixth concave reflector 1', it is transformed into a parallel light again, and is sent into the following stage such as the solid-state amplifier to be amplified. The present invention is not only utilized in the ICF spectrum shaping where the solid-state laser driver pursues a high-energy in addition to high peak irradiance, especially suitable for a high energy and ultra-high peak-power laser systems in CPA, but also utilized for a general laser spectrum shaping and spectrum modulation. FIG. 5 is a graph schematically illustrating the shaped pulse waveform of spectrum after modulation by the construction in FIG. 1. In FIG. 5, this symmetrical CTSI spectrum shaping system makes a depression in the centre wavelength of 1053 nm, and the spectrum modulation ratio can be controlled over 60% under the condition that the phase of the reflecting light remains nearly constant.

In the example 1, here the planar reflector for spectrum shaping function design 5 could be substituted by a multilayer dielectric thin film as a reflector for spectrum shaping with micro-structures in it, or a reflector for spectrum shaping with micro-mirrors structures in it, or a liquid crystal light valve, or a reflector for spectrum shaping with a varied line space grating in front of it, or a reflector for spectrum shaping with a liquid crystal spatial light modulator in front of it, or a reflector for spectrum shaping with micro-electromechanical mirrors, or a continuous deformation reflector for spectrum shaping, or a Bimorph deformation reflector for spectrum shaping, or a reflector for spectrum shaping with a prism/waveguide coupling, or a reflector for spectrum shaping with a varied line space grating. The example 1 is a realization of the spectrum shaping method for chirped pulse amplification, which accomplishes the modulation and the shaping of the spectrum.

Example 2 of the Method

In this example 2, there are those: the first grating 3 is the reflective planar blazed grating, which can endure the high power laser damage and can be fabricated in a large caliber. The planar reflector for spectrum shaping function design is a multilayer dielectric thin film as a planar reflector for spectrum shaping with microstructures in it. The concave reflectors are made in strictly eliminated the chromatic aberration, the spherical aberration, and the comatic aberration, to ensure the maximal deviation between the spectrum image plane and the planar reflector for spectrum shaping function design less than the tolerance of the half focal depth that is deduced from the Rayleigh's Criterion. The first aperture 6 is an aperture diaphragm, and the second aperture 10 is a slit diaphragm that is composed of a light barrier and its image in the planar reflector for spectrum shaping function design 5. And the first aperture 6 is the incident aperture, the second aperture 10 is the middle aperture, and the first aperture 6 is also the output aperture.

Figure 2:
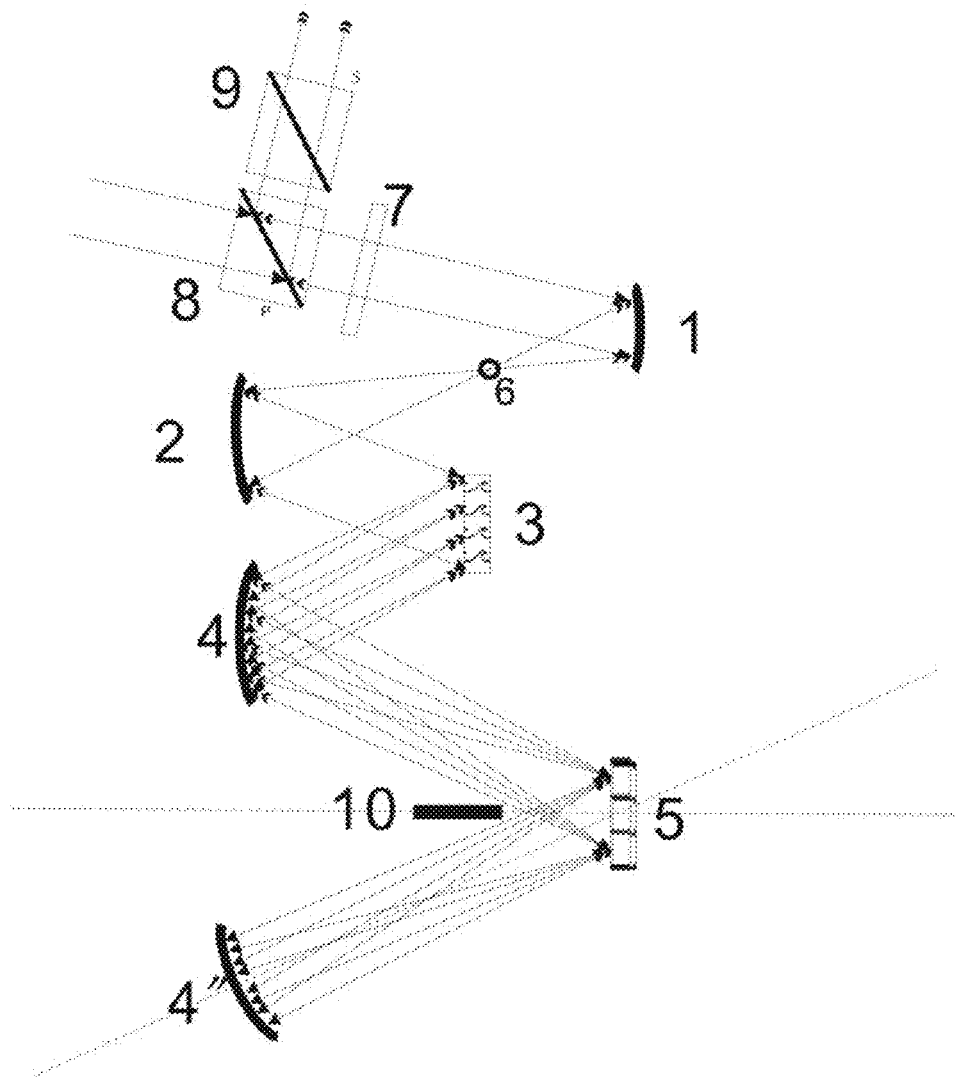

FIG. 2 schematically illustrates the structure of a self-collimation CTSI spectrum plane shaping system, which the above elements are settled in this optical path construction.

In this example 2, we adopt self-collimation CTSI spectrum plane shaping structure as the spectrum decomposing system and the spectrum synthesizing system; and the second aperture 10 and the planar reflector for spectrum shaping function design 5 constitute the spectrum shaping system.

The corresponding optical order is: firstly decomposing the spectrum of a chirped temporal pulse laser to a spectral domain plane which is in the focus plane by the spectrum decomposing system with CTSI construction; then shaping the spectrum in the spectral domain by the spectrum shaping system; finally synthesizing un-shiftily this shaped spectrum in the spectral domain into a temporal chirped pulse with a shaped design by the spectrum synthesizing system with the CTSI structure, in order to shape spectrum of the chirped pulse for amplification.

The self-collimation CTSI spectrum plane shaping spectrum decomposing system: describing in the optical path order, a laser beam from the front-end system of a CPA system passes through the first beam splitter prism 8 for polarization producing, then it passes through the ¼ wave plate 7 as the p-polarized light in Brewster's angle incidence. And then it passes through the first concave reflector 1 and the second concave reflector 2, which constitute the image transfer construction. Then it focuses onto the first aperture 6. Hence the illumination system is composed of the first concave reflector 1, the first aperture 6, and the second concave reflector 2. Here the first aperture becomes the incident aperture of the spectrum shaping example 2 structure. Then the laser beam passes through the second concave reflector 2, where it is transformed into a parallel light, and then it is projected onto the first grating 3, which constitutes the collimation system. However, because of the laser illumination, the first aperture 6 substitutes the slit diaphragm in general CTSI system, and serves as the real light source for the following system, which is the boundary of the beam of an incident light entering into the structure of self-collimation CTSI spectrum plane shaping system. The laser beam from the first aperture 6 passes through the second concave reflector 2, where it is transformed into a parallel light, and then it is projected onto the first grating 3, which comprises the dispersion system. After that, the diffraction light passes through the third concave reflector 4 imaging onto the second aperture 10. All these above constitute the whole spectrum decomposing system, which is denoted by the optical path order 6-2-3-4-5.

The spectrum shaping system: the spectral shaping system is composed of the second aperture 10 and the planar reflector for spectrum shaping function design 5 that is at the same place with the second aperture. The planar reflector for spectrum shaping function design 5 is featured as a multilayer dielectric thin film as a planar reflector for spectrum shaping with micro-structures in it, which makes the spectrum of chirped pulse a depression in the vicinity of the center but keeps the phase of the reflecting light nearly constant. Furthermore, the spectrum shaping system requires that the maximal deviation between the spectrum image plane and the planar reflector for spectrum shaping function design is less than the tolerance of the half focal depth, which is deduced from the Rayleigh's Criterion, and requires that the diameter 2 dr' of the disc of confusion in the focus plane, or the width a' of the disc of confusion in the direction of the dispersion are less than a certain value $a_0$. The FIG. 4 illustrates that: this planar reflector for spectrum shaping function design can make a depression in the vicinity of the spectral center to shape the reflective intensity into a designed spectrum distribution, where curve 1 is the incident chirped pulse spectrum, curve 2 is the modulation curve of a multilayer dielectric reflector determined by the microstructure, and curve 3 is the distribution of chirped pulse spectrum after modulation.

The self-collimation CTSI spectrum plane shaping synthesizing system: the diffraction light from the planar reflector for spectrum shaping function design 5 reflected by the centro-symmetric concave reflector 4" passes along the inversion optical path. So this example 2 construction is the same as the self-collimation imaging system and the self-collimation dispersion system. The features of the self-collimation CTSI spectrum plane shaping synthesizing system are: the structure in this example 2 optical path is simple, compact, and different from the Littrow system. When the backward wave passes through the above CTSI decomposing system 6-2-3-4-5, this structure in the inversion optical path constitutes the self-collimation CTSI spectrum synthesizing system, which accomplishes the dispersion cancelling function. That is to say, the modulation light reflected by the centro-symmetric concave reflector 4" passes through the second aperture 10 and the planar reflector for spectrum shaping function design 5 that is at the same place with the second aperture, which accomplish the spectral shaping again. Then the modulation light passes through the third concave reflector 4, where it is collimated onto the first grating 3, which these comprise a dispersion cancelling construction. Then, the parallel light from the first grating incident into the second concave reflector 2 focused onto the first aperture 6, which constitute a spectrum synthesizing system with the CTSI construction. All these above constitute the whole spectrum synthesizing system, which illustrates by the optical path order 4"-5-4-3-2-6. Finally the laser beam passes through the first aperture 6 ejecting out after the self-collimation CTSI spectrum plane shaping synthesizing system, and it is accomplished the imaging, the dispersion cancelling, and the synthesizing. Via the first concave reflector 1, it is transferred into a parallel light and accomplished the spectrum decomposing, modulation and synthesizing; and via the ¼ wave plate 7, its polarization rotates 90 degree. Then it is reflected fully at the first beam splitter prism 8 to the second beam splitter prism 9 that is perpendicular to the first one for cancelling the stray light of the modulated chirping pulse. Then it is sent into the following stage such as the solid-state amplifier to be amplified. The present invention is not only utilized in the ICF spectrum shaping that make the solid-state laser driver pursues a high-energy in addition to high peak irradiance, especially suitable for a high energy and ultra-high peak-power laser systems in CPA, but also utilized for a general laser spectrum shaping and spectrum modulation. The diffraction light is reflected back along the inversion optical path order and is projected to the dispersion system, so making the extra residual dispersion is zero practically. FIG. 5 is a graph schematically illustrating the shaped pulse waveform of spectrum after modulation by the construction in FIG. 2. And FIG. 5 illustrates that this self-collimation CTSI spectrum plane shaping system makes a depression in the centre wavelength of 1053 nm, and the spectrum modulation ratio can be controlled to be over 60% under the condition that the phase of the reflecting light remains nearly constant.

In the example 2, here the planar reflector for spectrum shaping function design 5 could be substituted by a multilayer dielectric thin film as a reflector for spectrum shaping with micro-structures in it, or a reflector for spectrum shaping with micro-mirrors structures in it, or a liquid crystal light valve, or a reflector for spectrum shaping with a varied line space grating in front of it, or a reflector for spectrum shaping with a liquid crystal spatial light modulator in front of it, or a reflector for spectrum shaping with micro-electromechanical mirrors, or a continuous deformation reflector for spectrum shaping, or a Bimorph deformation reflector for spectrum shaping, or a reflector for spectrum shaping with a prism/waveguide coupling, or a reflector for spectrum shaping with a varied line space grating. The example 2 is a realization of the spectrum shaping method for chirped pulse amplification, which accomplishes the modulation and the shaping of the spectrum making it to a designed shape.

Example 3 of the Method

In this example 3, there are those: the first grating 3 is a reflective planar blazed grating that can endure high power laser damage and can be fabricated in a large caliber; the concave reflector for spectrum shaping function design 5' is a multilayer dielectric thin film as a concave reflector for spectrum shaping with micro-structures in it; the concave reflectors are made with strictly eliminating the chromatic aberration, the spherical aberration, and the comatic aberration, to ensure the maximal deviation between the spectrum image plane and the planar reflector for spectrum shaping function design less than the tolerance of the half focal depth, which is deduced from the Rayleigh's Criterion. The first aperture 6 is the aperture diaphragm, and also is the incident aperture and the output aperture.

Figure 3:
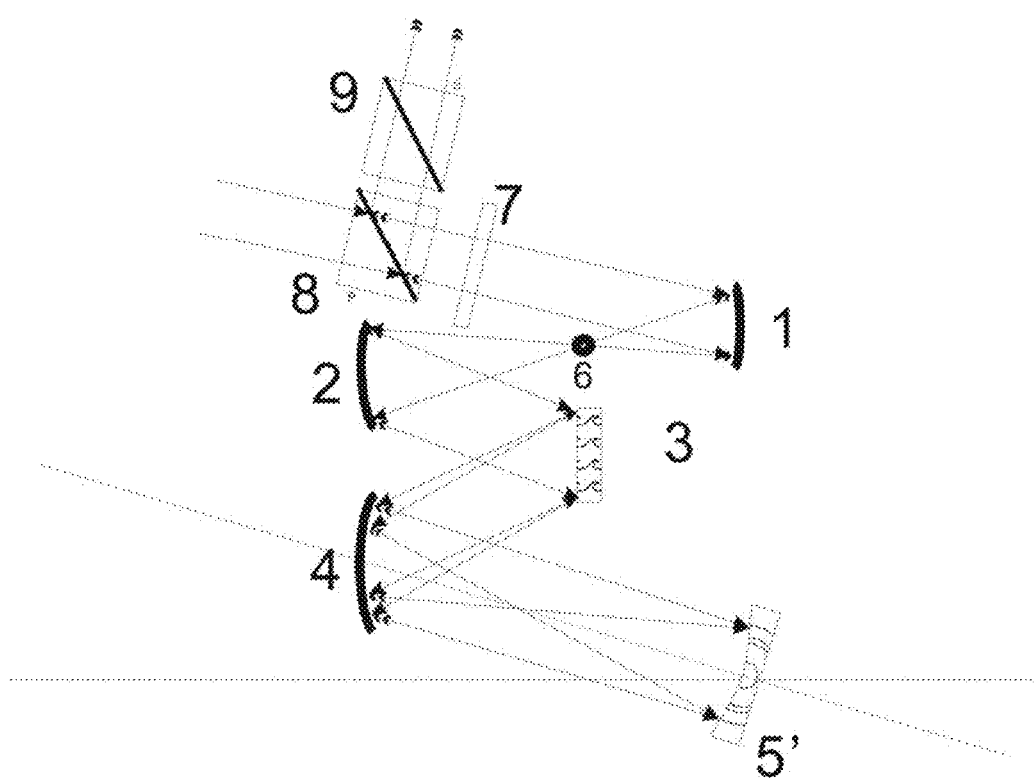

FIG. 3 schematically illustrates the structure of a self-collimation CTSI spectrum concave shaping system, which the above elements are settled in this optical path construction:

In this example 3, we adopt the self-collimation CTSI spectrum concave shaping structure as the spectrum decomposing system and the spectrum synthesizing system; and select the concave reflector for spectrum shaping function design 5' as the spectrum shaping system. Described in the optical path is: firstly decomposing the spectrum of a chirped temporal pulse laser to a spectral domain plane which is in the focus plane by the spectrum decomposing system with CTSI construction; then shaping the spectrum in the spectral domain by the spectrum shaping system; finally synthesizing un-shiftily this shaped spectrum in the spectral domain into a temporal chirped pulse with a designed shape by the spectrum synthesizing system with the CTSI structure, in order to shape spectrum of the chirped pulse for amplification.

The self-collimation CTSI spectrum concave shaping decomposing system: describing in the optical path order, a laser beam from the front-end system of a CPA system passes through the first beam splitter prism 8 for polarization producing, then passes through the ¼ wave plate 7 as the p-polarized light in Brewster's angle incidence. And it passes through the first concave reflector 1 and the second concave reflector 2, which constitute the image transfer construction. Then it focuses onto the first aperture 6. Hence the illumination system is composed of the first concave reflector 1, the first aperture 6, and the second concave reflector 2. Here the first aperture becomes the incident aperture of the spectrum shaping example 3 structure. It passes through the second concave reflector 2, where it is transformed into a parallel light. Then it is projected onto the first grating 3, which constitute the collimation system. However, because of the laser illumination, the first aperture 6 substitutes the slit diaphragm in general CTSI system, which the first aperture 6 is the real light source for the following system, and is the boundary of the beam of an incident light entering into the structure of self-collimation CTSI spectrum concave shaping system. The laser beam from the first aperture 6 passes through the second concave reflector 2, where it is transformed into a parallel light, and then it is projected onto the first grating 3, which is the dispersion system. After that, the diffraction light passes through the third concave reflector 4 imaging onto the concave reflector for spectrum shaping function design 5'. All these above constitute the whole spectrum decomposing system, which is denoted by the optical path order 6-2-3-4-5'.

The spectrum shaping system: the concave reflector for spectrum shaping function design 5' is a concave reflector coated with multilayer dielectric thin film consisting of alternately arranged high reflective and low reflective material, which can makes the spectrum of chirped pulse a depression in the vicinity of the center and keeps the phase of the reflecting light nearly constant. And the spectrum shaping system requires that the maximal deviation between the surface of spectrum image and the surface of the concave reflector for spectrum shaping function design 5' is less than the tolerance of the half focal depth, which is deduced from the Rayleigh's Criterion, and requires that the diameter of the disc of confusion in the surface of the concave reflector for spectrum shaping function design 5' is 2 dr', or the width of the disc of confusion in the direction of the dispersion is a', which all must be less than a certain value $a_0$. The FIG. 4 illustrates that: the concave reflector for spectrum shaping function design 5' can make a depression in the vicinity of the center wavelength to shape the reflective intensity into a designed spectrum distribution, where curve 1 is the incident chirped pulse spectrum, curve 2 is the modulation curve of a multilayer dielectric reflector determined by the microstructure, and curve 3 is the distribution of chirped pulse spectrum after modulation.

The self-collimation CTSI spectrum concave shaping synthesizing system: the diffraction light from the concave reflector for spectrum shaping function design 5' is reflected and passed along the inversion optical path. So this example 3 is the same as the self-collimation imaging system and the self-collimation dispersion system. The features of the self-collimation CTSI spectrum concave shaping synthesizing system are: the structure in the optical path is simple, compact, and different from the Littrow system. When the diffraction light passes through the above CTSI decomposing system 6-2-3-4-5', this structure comprises the self-collimation CTSI spectrum concave shaping synthesizing system, which accomplishes the dispersion cancelling. Describing in the optical path order: the modulation light is modulated and reflected by the concave reflector for spectrum shaping function design 5'; then the modulation light passes through the third concave reflector 4, where it is collimated to the first grating 3, which these constitute a dispersion cancelling construction. Then, the parallel light from the first grating 3 passes through the second concave reflector 2, where it is focused to the first aperture 6, which constitute a spectrum synthesizing system with CTSI construction. These comprise the whole spectrum synthesizing system, which is denoted by the optical path order 5'-4-3-2-6. Finally it passes through the first aperture ejecting out after the self-collimation CTSI spectrum concave shaping synthesizing system; via the first concave reflector 1, it is transferred into a parallel light and accomplished the spectrum decomposing, modulation and synthesizing. and via the ¼ wave plate 7, its polarization rotates 90 degree, it is reflected fully at the first beam splitter prism 8 to the second beam splitter prism 9 that is perpendicular to the first one for cancelling the stray light of the modulated chirping pulse. Then it is sent into the following stage such as the solid-state amplifier to be amplified. The present invention is not only utilized in the ICF spectrum shaping that making the solid-state laser driver pursues a high-energy in addition to high peak irradiance, especially suitable for a high energy and ultra-high peak-power laser systems in CPA, but also utilized in a general laser spectrum shaping and spectrum modulation. The concave reflector for spectrum shaping function design 5' reflects the diffraction light to the third concave reflector 4 along the inversion optical path order, which it is projected into the dispersion system. This construction in this example 3 is the same as the self-collimation system. The diffraction light is reflected back along the inversion optical path order and is projected to the dispersion system, so making the extra residual dispersion is zero practically. FIG. 5 is a graph schematically illustrating the shaped pulse waveform of spectrum after modulation by the construction in FIG. 3. And FIG. 5 illustrates that this self-collimation CTSI spectrum concave shaping system makes a depression in the centre wavelength of 1053 nm, and the spectrum modulation ratio can be controlled to be over 60% under the condition that the phase of the reflecting light remains nearly constant.

In the example 3, here the concave reflector for spectrum shaping function design 5' could be substituted by a multi-layer dielectric thin film as a concave reflector for spectrum shaping with micro-structures in it, or a concave reflector for spectrum shaping with micro-mirrors structures in it, or a concave liquid crystal light valve, or a concave reflector for spectrum shaping with a varied line space plane grating in front of it, or a concave reflector for spectrum shaping with a liquid crystal spatial light modulator in front of it, or a concave reflector for spectrum shaping with micro-electromechanical mirrors, or a concave continuous deformation reflector for spectrum shaping, or a concave bimorph deformation reflector for spectrum shaping, or a concave reflector for spectrum shaping with a prism/waveguide coupling, or a concave reflector for spectrum shaping with a varied line space plane grating. The example 3 is a realization of the spectrum shaping method for chirped pulse amplification, which accomplishes the modulation and the shaping of the spectrum making it to a designed shape.

The invention claimed is:

1. A spectrum shaping scheme for chirped pulse amplification (CPA):
   of which the features are the comprising: a spectrum decomposing system with Czerny-Turner Spectroscope Instrument (CTSI) construction, and a spectrum synthesizing system with CTSI structure that is symmetrical to the decomposing structure; in addition, a spectrum shaping system including an aperture and a planar reflector for spectrum shaping function design;
   of which the features are the processing: firstly decomposing the spectrum of a chirped temporal pulse laser to a spectral domain plane; then shaping the spectrum in the spectral domain; finally synthesizing un-shiftily this shaped spectrum in the spectral domain into a temporal chirped pulse with a designed shape;
   of which the features are the optical path order: a laser beam from the front-end system of a CPA system passes through the first concave reflector (1), where it is transformed into a parallel light; then via the first aperture (6), and the second concave reflector (2), the first grating (3), the third concave reflector (4) and the second aperture (10), which constitute a spectrum decomposing system with CTSI construction and accomplish the collimation, the dispersion, and the imaging function; then it passes through the second aperture (10) and the planar reflector for spectrum shaping function design (5) that is at the same place with the second aperture, which accomplish the spectral shaping function in the spectral domain; after that, it passes through the fourth concave reflector (4'), the second grating (3'), the fifth concave reflector (2') and the third aperture (6'), which constitute a spectrum synthesizing system with CTSI construction and accomplish the imaging, the dispersion cancelling, and the synthesizing function; finally it passes through the third aperture (6') ejecting out after chirped pulse spectrum decomposing, modulation, and synthesizing; then via the sixth concave reflector (1'), it is transformed into a parallel light again, and sent into the following stage such as the solid-state amplifier for amplification.

2. The spectrum shaping scheme as recited in claim 1, of which the features are: wherein the first grating (3), and the second grating (3') are the reflective planar blazed grating, and at the same time they are symmetrical to each other;
   wherein the dispersion cancelling is tuning these two gratings to ensure that: from the inversion optical path, tracing the direction of spectral distribution of different wavelength at the second aperture (10) in the spectrum synthesizing system with CTSI construction, and making it be the same as the direction of the spectral distribution of the different wavelength at the second aperture (10) in the spectrum decomposing system with CTSI construction in the normal optical path tracing.

3. The spectrum shaping scheme as recited in claim 1, of which the features are: wherein the first aperture (6), and the third aperture (6') are the aperture diaphragm in the real confocal telescope, which constructed as an illumination system and as an image transfer construction;
   wherein the illumination system consists of the first concave reflector (1), the first aperture (6) and the second concave reflector (2), or consists of the sixth concave reflector (1'), the third aperture (6') and the fifth concave reflector (2'), which ensures that the normal width is suitable for the coherence and the phase consisted conditions for a incident light, the distribution of the laser beam obtained from the front-end system of a CPA system do not changed in the spatial and temporal domain, the relative aperture in the illumination system must match with the relative apertures in the dispersion system and in the imaging system, and the clear aperture can fill the caliber of the dispersion element;
   wherein the second aperture (10) is a slit diaphragm composed of a light barrier and its image in the planar reflector for spectrum shaping function design (5), and all aperture must satisfy the normal width $a_0$ condition for a diaphragm, or the diffraction half width $a_0$ condition for the spectrum decomposing system with CTSI construction and the spectrum synthesizing system with CTSI construction, at the same time the second aperture (10) and the third aperture (6') can pass through the light with all the frequency components within the chirped laser pulse bandwidth;
   wherein the optics components are constructed a symmetrical imaging system relative to the dispersion component, or are constructed an asymmetrical imaging system relative to the dispersion component for compensating the aberration of the image;
   wherein the spectrum decomposing system with CTSI construction and the spectrum synthesizing system with CTSI construction must ensure that, in both system, the focal length of the collimation system and the focal length of the imaging system are equal, and also the lateral magnifications are equal; or the constructions of the spectrum decomposing system and the spectrum synthesizing system are absolutely symmetrical, and furthermore, tracing in the inversion optical path direction, the focal length of the collimation system and the focal length of the imaging system are equal, and also the lateral magnifications are equal;
   wherein all the concave reflectors are made with the chromatic aberration, the spherical aberration, the comatic aberration, the astigmatism and the field curvature eliminated strictly in the whole working frequency bandwidth, to ensure the maximized deviation between the spectrum image plane and the planar reflector for spectrum shaping function design less than the tolerance of the half focal depth.

4. The spectrum shaping scheme as recited in claim 1, of which the features are: wherein the planar reflector for spectrum shaping function design could be a multilayer dielectric thin film as a reflector for spectrum shaping with microstructures in it, or a reflector for spectrum shaping with micromirrors structures in it, or a liquid crystal light valve, or a reflector for spectrum shaping with a varied line space grating in front of it, or a reflector for spectrum shaping with a liquid crystal spatial light modulator in front of it, or a reflector for spectrum shaping with micro-electromechanical mirrors, or a continuous deformation reflector for spectrum shaping, or a bimorph deformation reflector for spectrum shaping, or a reflector for spectrum shaping with a prism/waveguide coupling, or a reflector for spectrum shaping with a varied line space grating.

5. A spectrum shaping scheme for chirped pulse amplification (CPA):
of which the features are the comprising: a spectrum decomposing system and a spectrum synthesizing system with a planar modulation structure, with a CTSI structure, and with an autocollimation optical path construction; in addition, a spectrum shaping system including an aperture and a planar reflector for spectrum shaping function design;
of which the features are the processing: firstly decomposing the spectrum of a chirped temporal pulse laser to a spectral domain plane; then shaping the spectrum in the spectral domain; finally synthesizing un-shiftily this shaped spectrum in the spectral domain into a temporal chirped pulse with a designed shape;
of which the features are the optical path order: a laser beam from the front-end system of a CPA system passes through the first beam splitter prism (8) for polarization producing, via the ¼ wave plate (7) and the first concave reflector (1), then it passes through the first aperture (6), and the second concave reflector (2), the first grating (3), the third concave reflector (4) and the second aperture (10), which constitute a spectrum decomposing system with CTSI construction and accomplish the collimation, the dispersion, and the imaging function; then it passes through the second aperture (10) and the planar reflector for spectrum shaping function design (5) that is at the same place with the second aperture, which accomplish the spectral shaping function in the spectral domain; after that, it is reflected by the centro-symmetric concave reflector (4"), and its backward wave passes through the second aperture (10) and the planar reflector for spectrum shaping function design (5) that is at the same place with the second aperture, which accomplish the spectral shaping again; then its backward wave passes through the third concave reflector (4), where it is collimated to the first grating (3), which these (4")-(10)-(5)-(4)-(3) constitute a dispersion cancelling construction; then, the parallel light incident into the second concave reflector (2) is focused onto the first aperture (6), which these (4")-(10)-(5)-(4)-(3)-(2)-(6) constitute a spectrum synthesizing system with the CTSI construction and accomplish the imaging, the dispersion cancelling, and the synthesizing function; finally the beam passes through the first aperture (6) ejecting out after chirped pulse spectrum decomposing, modulation, and synthesizing; via the first concave reflector (1) and the ¼ wave plate (7), its polarization rotates 90 degree; then it is reflected fully at the first beam splitter prism (8) to the second beam splitter prism (9) that is perpendicular to the first one for a polarization producing of the modulated chirping pulse, and then it is sent into the following stage such as the solid-state amplifier for amplification.

6. The spectrum shaping scheme as recited in claim 5, of which the features are: wherein the first aperture (6) is the aperture diaphragm in the real confocal telescope, which constructed as an illumination system and as an image transfer system;
wherein the illumination system consists of the first concave reflector (1), the first aperture (6) and the second concave reflector (2), which ensures that the normal width is suitable for the coherence and phase consisting conditions for a incident light, the distribution of a laser beam obtained from the front-end system of a CPA system do not changed in the spatial and temporal domain, and the relative aperture in the illumination system must match with the relative apertures in the dispersion system and in the imaging system, and the clear aperture can fill the caliber of the dispersion element;
wherein the second aperture (10) is a slit diaphragm composed of a light barrier and its image in the planar reflector for spectrum shaping function design (5), and all aperture must satisfy the normal width $a_0$ condition for a diaphragm, or the diffraction half width $a_0$ condition for the spectrum decomposing system with CTSI construction and the spectrum synthesizing system with CTSI construction, at the same time the second aperture (10) and the third aperture (6') can pass through the light with all the frequency components within the chirped laser pulse bandwidth;
wherein the first grating (3) is the reflective planar blazed grating;
wherein all the concave reflectors are made with the chromatic aberration, the spherical aberration, the comatic aberration, the astigmatism and the field curvature eliminated strictly in the whole working frequency bandwidth, to ensure the maximized deviation between the spectrum image plane and the planar reflector for spectrum shaping function design less than the tolerance of the half focal depth;
wherein the optics components are constructed a symmetrical imaging system relative to the dispersion component, or are constructed an asymmetrical imaging system relative to the dispersion component for compensating the aberration of the image.

7. The spectrum shaping scheme as recited in claim 5, of which the features are: wherein the planar reflector for spectrum shaping function design could be a multilayer dielectric thin film as a reflector for spectrum shaping with microstructures in it, or a reflector for spectrum shaping with micromirrors structures in it, or a liquid crystal light valve, or a reflector for spectrum shaping with a varied line space grating in front of it, or a reflector for spectrum shaping with a liquid crystal spatial light modulator in front of it, or a reflector for spectrum shaping with micro-electromechanical mirrors, or a continuous deformation reflector for spectrum shaping, or a bimorph deformation reflector for spectrum shaping, or a reflector for spectrum shaping with a prism/waveguide coupling, or a reflector for spectrum shaping with a varied line space grating.

8. A spectrum shaping scheme for chirped pulse amplification (CPA):
of which the features are the comprising: a spectrum decomposing system and a spectrum synthesizing system with a concave modulation structure, with a CTSI structure, and with an autocollimation optical path construction; in addition, a spectrum shaping system including an aperture and a concave reflector for spectrum shaping function design;

of which the features are the processing: firstly decomposing the spectrum of a chirped temporal pulse laser to a spectral domain plane; then shaping the spectrum in the spectral domain; finally synthesizing un-shiftily this shaped spectrum in the spectral domain to a temporal chirped pulse with a designed shape;

of which the features are the optical path order: a laser beam from the front-end system of a CPA system passes through the first beam splitter prism (8) for polarization producing, via the ¼ wave plate (7) and the first concave reflector (1), then it passes through the first aperture (6), and the second concave reflector (2), the first grating (3), the third concave reflector (4) and the concave reflector for spectrum shaping function design (5'), which constitute a spectrum decomposing system with CTSI construction and accomplish the collimation, the dispersion, and the imaging function; then it is modulated by the concave reflector for spectrum shaping function design (5'), which accomplishes the spectral shaping function in the spectral domain; after that, it is reflected by the concave reflector for spectrum shaping function design (5'), and then its backward wave passes through the third concave reflector (4), where it is collimated onto the first grating (3), which these (5')-(4)-(3) constitute a dispersion cancelling construction; then, the parallel light incident into the second concave reflector (2) is focused onto the first aperture (6), which constitute a spectrum synthesizing system with the CTSI construction and accomplish the imaging, the dispersion cancelling, and the synthesizing function; finally it passes through the first aperture (6) ejecting out after the spectrum decomposing, modulation, and synthesizing; via the first concave reflector (1) and the ¼ wave plate (7), and its polarization rotates 90 degree; then the beam is reflected fully at the first beam splitter prism (8) to the second beam splitter prism (9) that is perpendicular to the first one for a polarization producing of the modulated chirping pulse, then sent into the following stage such as the solid-state amplifier for amplification.

9. The spectrum shaping scheme as recited in claim 8, of which the features are: wherein the first aperture (6) is the aperture diaphragm in the real confocal telescope, which constructed as an illumination system and as an image transfer system;

wherein the illumination system consists of the first concave reflector (1), the first aperture (6) and the second concave reflector (2), which ensures that the normal width is suitable for the coherence and the phase consisted conditions for a incident light, the distribution of the laser beam obtained from the front-end system of a CPA system do not changed in the spatial and temporal domain; and the relative aperture in the illumination system must match with the relative apertures in the dispersion system and in the imaging system; and the clear aperture can fill the caliber of the dispersion element;

wherein all aperture must satisfy the normal width $a_0$ condition for a diaphragm, or the diffraction half width $a_0$ condition for the spectrum decomposing system with CTSI construction and the spectrum synthesizing system with CTSI construction, at the same time the first aperture (6) can pass through the light with all the frequency components within the chirped laser pulse bandwidth;

wherein the first grating (3) is the reflective planar blazed grating;

wherein all the concave reflectors are made with the chromatic aberration, the spherical aberration, the comatic aberration, the astigmatism and the field curvature eliminated strictly in the whole working frequency bandwidth, to ensure the maximized deviation between the spectrum image plane and the planar reflector for spectrum shaping function design less than the tolerance of the half focal depth;

wherein all the optics components are constructed a symmetrical imaging system relative to the dispersion component, or are constructed an asymmetrical imaging system relative to the dispersion component for compensating the aberration of the image.

10. The spectrum shaping scheme as recited in claim 8, of which the features are: wherein the concave reflector for spectrum shaping function design is coated with high reflective and low reflective alternately multilayer dielectric thin film and with micro-structures in it, or a concave reflector for spectrum shaping with micro-mirrors structures in it, or a concave liquid crystal light valve, or a concave reflector for spectrum shaping with a varied line space plane grating in front of it, or a concave reflector for spectrum shaping with a liquid crystal spatial light modulator in front of it, or a concave reflector for spectrum shaping with micro-electromechanical mirrors, or a concave continuous deformation reflector for spectrum shaping, or a concave bimorph deformation reflector for spectrum shaping, or a concave reflector for spectrum shaping with a prism/waveguide coupling, or a concave reflector for spectrum shaping with a varied line space plane grating.

* * * * *